(12) United States Patent  
Chapman et al.

(10) Patent No.: US 9,370,908 B1
(45) Date of Patent: Jun. 21, 2016

(54) HEAT-SHRINK TUBING PROCESS APPARATUS AND METHOD OF MAKING HEAT-SHRINK TUBING

(71) Applicant: Fluoron Inc., Elkton, MD (US)

(72) Inventors: Frank Myron Chapman, Elkton, MD (US); Christopher Lee Geary, Newark, DE (US)

(73) Assignee: Fluoron Inc., Elkton, MD (US)

( * ) Notice: Subject to any disclaimer, the term of this patent is extended or adjusted under 35 U.S.C. 154(b) by 409 days.

(21) Appl. No.: 13/896,102

(22) Filed: May 16, 2013

Related U.S. Application Data (60) Provisional application No. 61/648,613, filed on May 18, 2012.

(51) Int. Cl.
*B29C 57/04* (2006.01)
*B29D 23/00* (2006.01)

(52) U.S. Cl.
CPC ..................................... *B29D 23/00* (2013.01)

(58) Field of Classification Search
CPC ............ B29C 44/304; B29C 2045/2729; B29C 73/063; B29C 35/06
USPC ............ 264/40.7, 209.5, 237, 532, 565, 573; 425/72.1, 325, 326.1, 393
See application file for complete search history.

(56) References Cited

U.S. PATENT DOCUMENTS

| | | | |
|---|---|---|---|
| 2,762,720 A | 9/1956 | Michel | |
| 3,196,194 A | 7/1965 | Ely, Jr. et al. | |
| 3,253,619 A | 5/1966 | Cook et al. | |
| 3,303,243 A | 2/1967 | Hughes et al. | |
| 3,417,176 A | 12/1968 | Anderson et al. | |
| 3,664,783 A | 5/1972 | Murray | |
| 3,949,110 A | 4/1976 | Nakajima et al. | |
| 4,985,197 A | 1/1991 | Isozaki et al. | |
| 5,368,811 A | 11/1994 | Taniguchi et al. | |
| 5,605,502 A | 2/1997 | Christensen | |
| 5,942,171 A * | 8/1999 | Prenger ............... B29C 47/0023 264/209.5 |
| 2002/0098961 A1 | 7/2002 | Chapman | |

FOREIGN PATENT DOCUMENTS

| GB | 1056970 | 2/1967 |
|---|---|---|
| GB | 1380325 | 1/1975 |

\* cited by examiner

*Primary Examiner* — Joseph S Del Sole
*Assistant Examiner* — Thukhanh T Nguyen
(74) *Attorney, Agent, or Firm* — Invention To Patent Services; Alex Hobson (57) ABSTRACT

A continuous heat-shrink tubing process is described having an expansion element disposed with the tubing and a position maintenance feature to keep the expansion element in a desired location. The expansion element may be maintained in a position by pressurized fluid trapped within the tubing between the expansion element and pinch rollers. The pinch roller may be moved to reduce the volume within the section of tubing between the pinch roller nip and the expansion element, and thereby increase the pressure of the trapped fluid. In another embodiment, the expansion element may be held in place by an extruder connector. In yet another embodiment, the expansion element incorporates a magnetic component, or has at least one magnet, or magnetic metals and one or more magnets are configured to maintain an expansion element position through attractive or repulsive magnetic forces.

13 Claims, 4 Drawing Sheets

HEAT-SHRINK TUBING PROCESS APPARATUS AND METHOD OF MAKING HEAT-SHRINK TUBING

CROSS REFERENCE TO RELATED APPLICATIONS

This application claims the benefit of U.S. provisional patent application No. 61/648,613 filed on May 18, 2012 and entitled Heat-Shrink Tubing Process Apparatus and Method of Making Heat-Shrink Tubing, which is incorporated by reference herein in its entirety.

BACKGROUND OF THE INVENTION

1. Field of the Invention

The present invention relates to a heat-shrink tubing process apparatus and a method of making a thermally shrinkable polymeric tube, or heat-shrink tube, and in particular a fluoropolymer heat-shrink tube.

2. Background

Heat-shrink tubes are used in a variety of applications including, but not limited to, mandrel and roll covers that are used in various processes including electronic devices, such as copiers, electrical wire and cable covers, fluorescent light bulbs, joints and terminal ends and the fabrication of carbon fiber reinforced plastic shapes. Discrete lengths of heat-shrink tubing can be made by heating a tube and expanding it inside a pipe or tube of any material to determine the size or over a mandrel and expanding the mandrel through an inflation means and then cooling the plastic tube while in an expanded state. A mandrel may comprise a bladder or other means to radially expand and contract. Methods and processes for making continuous lengths of heat-shrink tubing create many challenges however.

SUMMARY OF THE INVENTION

The invention is directed to a heat-shrink tubing process apparatus and a method of making a thermally shrinkable polymeric tube, or heat-shrink tube.

In an exemplary embodiment of the invention, a process apparatus for making heat-shrink tubing comprises a first chamber that is heated, a second chamber that is maintained at a temperature that is lower than the first chamber, an expanding mandrel having an outer diameter greater than a pre-processed tube and a pinch-roll apparatus coupled to a conveyor that may be used to maintain the position of the expansion mandrel within the tubing. The expansion mandrel or element may be placed within the tubing and positioned within one and preferably between two chambers. The tubing is conveyed into the first chamber where it is heated to an elevated temperature and subsequently expanded over the expansion element. The expanded tubing passes through a second chamber where it is cooled in an expanded state. Cooling the tubing while in an expanded state imparts heat-shrink properties to the tubing. Residual stresses are locked into the tubing at the expanded diameter and subsequent heating causes the tubing to shrink.

The expanded and cooled tubing is then passed through a pinch-roll apparatus that may be coupled to a conveyor. Trapped air within the tubing, between the pinch-roll apparatus nip and the expansion element, keeps the expansion element from being conveyed with the tubing. When the expansion element moves closer to the pinch-roll apparatus nip, the pinch-roll apparatus may be moved toward the expansion element to increase the pressure of the trapped air or fluid within the tubing and force the expansion element to move back to a desired location. This apparatus and method of maintaining the position of the expansion element is an exemplary position maintenance feature, as described herein. Movement of the pinch-roll apparatus may be controlled manually, by an operator, or an expansion element location sensor may be configured to monitor the location of the expansion element and when coupled to a controller, may be used to automatically control the position of the expansion element through automatic movement of the pinch-roll apparatus.

Any suitable polymeric tubing may be expanded and made into a heat-shrink tubing using the process apparatus described herein including, but not limited to, tubing comprising polymers selected from, polyolefin, nylon, fluoropolymer, such as FEP, PFA, PTFE, ETFE and any other suitable thermoplastic polymer, copolymers and combinations thereof. The tubing may have any suitable inner diameter including, but not limited to, greater than about 2 mm, greater than about 5 mm, greater than about 1 cm, greater than about 2 cm, greater than about 5 cm, greater than about 10 cm, greater than about 25 cm, greater than about 50 cm and any range between and including the outer diameters provided. In an exemplary embodiment, the tubing has an outer diameter between about 2 cm and 5 cm. The tubing may have any suitable wall thickness including, but not limited, greater than about 0.1 mm, greater than about 0.2 mm, greater than about 0.5 mm, greater than about 1 mm, greater than about 2 mm, greater than about 5 mm, greater than about 10 mm, greater than about 20 mm and any range between and including the wall thickness values provided. The tubing may have any suitable length, as this process is configured for continuous processing of the tubing, and is not limited to specific pre-processed tubing lengths. For example, the tubing may have a length of more than about 5 m, more than about 10 m more than about 50 m, more than about 100 m, more than about 500 m, more than about 1,000 m, and any range between and including the lengths provided.

The first chamber may be any suitable type of chamber that heats the tubing to an appropriate temperature. The chamber may comprise any suitable type of heated fluid, including gas or liquid, including, but not limited to, water, oils and the like. In an exemplary embodiment, the chamber is a bath of water heated to an elevated temperature. The chamber may comprise a heating element, or heated liquid may be introduced into the chamber. For example, a first chamber may have a first chamber fluid inlet and a first fluid outlet, whereby heated fluid is introduced into the chamber and fluid is removed by the outlet. The fluid inlet and fluid outlet may be configured such that the fluid outlet is in a location where the fluid may be cooler than near the fluid inlet. The first chamber may further comprise a tubing accumulator, such as a one or more idler rollers whereby the tubing may be configured around the roller or rollers. The first chamber may be heated, or comprise a fluid heated to any suitable temperature including but not limited to, more than about 50° C., more than about 75° C., more than about 100° C., more than about 150° C., more than about 200° C., more than about 250° C., more than about 300° C., more than about 350° C., and any range between and including the temperatures provided. The temperature may be selected to suitable soften and or prepare the tubing for expanding over the expansion element.

The process apparatus for making heat-shrink tubing described herein may comprise a second chamber for cooling the expanded tubing. However, it may be possible to allow the heated and expanded tubing to air cool between the first chamber and the pinch-roll apparatus. In addition, cooling air or liquid may be passed over the tubing after it exits the first chamber thereby quickly cooling it and locking in the residual stress. A physical chamber may not be needed to quickly cool the tubing. In an exemplary embodiment however, a second chamber comprising a fluid maintained at a temperature below the temperature of the first chamber may be used to cool the expanded tubing. As with the first chamber, the second chamber may comprise any suitable fluid, an accumulator, and a fluid inlet and outlet. In an exemplary embodiment, the second chamber comprises water that is maintained at a significantly lower temperature than the first chamber. Any suitable differential in temperature between the first and second chamber fluid temperatures may be used including, but not limited to, more than about 10° C., more than about 20° C., more than about 50° C., more than about 100° C., more than about 150° C., more than about 200° C., more than about 250° C., more than about 300° C., and any range between and including the temperature differentials provided. The second chamber fluid may be maintained at a temperature that is at room temperature, 23° C. or below, and the first chamber may be heated to a temperature that is at least 100 C above room temperature.

The first and second chambers may be configured in any suitable way. For example, the first and second chambers may be in separate locations and may not be coupled, or may be coupled, having a seal, such as a mechanical lip seal or some other sealing device between the two chambers. In one embodiment, the first and second chambers are coupled, and a diaphragm reduces the leakage of fluid from the first chamber to the second chamber. In another embodiment, the first and second chambers are not coupled and the tubing is conveyed out of the first chamber and subsequently into the second chamber.

The expansion element, as described herein, may be any suitable shape, and may comprise a tapered leading portion and/or tapered trailing portion. The expansion element may be configured with any suitable outer diameter including, but not limited to, greater than about 2 mm, greater than about 5 mm, greater than about 1 cm, greater than about 2 cm, greater than about 5 cm, greater than about 10 cm, greater than about 25 cm, greater than about 50 cm, and any range between and including the outer diameters provided. The expansion element may be configured with any suitable length including, but not limited to, greater than about 1 cm, greater than about 2 cm, greater than about 3 cm, greater than about 5 cm, greater than about 7 cm, greater than about 10 cm, greater than about 20 cm, greater than about 50 cm, greater than about 100 cm and any range between and including the lengths provided. The expansion element may have a body portion between the leading and trailing portion. The body portion may be configured with a constant outer diameter over at least a portion of the length of the body portion, or may have a variable diameter over the body portion. The leading and/or trailing portion of an expansion element may be tapered to a point, or tapper to a smaller diameter than the body portion. The leading or trailing portion may be configured with a concave or convex end. The expansion element may comprise, consist essentially of, or consist of any suitable material including, but not limited to, metal, plastic, fluoroplastic including PTFE, glass, ceramic, epoxy and the like. In an exemplary embodiment, the expansion element has a low friction outer surface that enables the tubing to more easily slide over the expansion element.

The expansion element, as described herein, may be configured to expand the diameter of the tubing any suitable percentage, including up to the limit of the material. Some tubing may comprise materials that can be expanded to a high degree, such as more than 100%, or as high as 400%. The expansion element, as described herein, may have an outer diameter that is any suitable percentage larger than the pre-processed tubing inner diameter including, but not limited to, greater than about 5%, greater than about 10%, greater than about 15%, greater than about 20%, greater than about 25%, greater than about 35%, greater than about 50%, greater than about 100%, greater than about 200%, greater than about 400%, and any range between and including the percentages provided.

The process apparatus for making heat-shrink tubing comprises a pinch-roll apparatus having a first roller and a second roller configured to produce a nip, wherein the tubing in pinched and pulled there through. The nip of the pinch-roll apparatus effectively seals the fluid, for example air, trapped in the tubing between the nip and the expansion element. In an exemplary embodiment, at least one of the pinch rollers comprises an elastomeric pinch surface. The pinch-roll apparatus may be coupled to a conveyor configured to move the pinch-roll apparatus back or forward. The conveyor may be coupled to a user interface, whereby an operator may adjust the position of the pinch-roll apparatus. The conveyor may be used to move the pinch-roll apparatus when the expansion element has moved from a desirable location. For example, the pinch-roll apparatus may be moved forward when the expansion element moves too close to the nip, or out of a desired location. Moving the pinch-roll apparatus and nip position forward, or closer to the expansion element increases the pressure of the fluid trapped between the nip and the expansion element and thereby forces the expansion element to move back into a desired location. In an exemplary embodiment, an expansion element location sensor may be configured to monitor the position of the expansion element and provide a signal to the conveyor controller when the expansion element has moved out of a desirable location. The conveyor controller may then move the pinch-roll apparatus forward to correct the location of the expansion element. The fluid trapped within the tubing between the nip and the expansion element may be any suitable fluid including, but not limited to, gas or air, liquid, water, oil, solutions, emulsions and the like. An exemplary position maintenance feature comprises a pinch-roll, and any means to move the pinch-roll to increase the pressure of trapped fluid within the tubing including a conveyor and a drive mechanism to move the conveyor, for example.

The process apparatus for making heat-shrink tubing may further comprise a pay-off and/or take-up for conveying a length of tubing through the apparatus. In one embodiment, the tubing is cut to a desired length after being conveyed through the pinch-roll apparatus. In another embodiment, the tubing is conveyed into the apparatus from an extruder.

The heat-shrink tube process apparatus, as described herein, may be used to make a heat-shrink tube by: inserting an expansion element into a tube; configuring the tubing through a first heated chamber and through the nip of the pinch-roll apparatus; starting said pinch-roll apparatus to pull the tubing through the process apparatus; and moving said pinch-roll apparatus to maintain the expansion element in a desired location. In one embodiment, the tubing is cooled after it exits the first chamber by any suitable method, such as by fluid stream passing over the tube. In one embodiment, the method comprises configuring the tubing into a second chamber having a second fluid that is at a lower temperature than the fluid in the first chamber. In yet another embodiment, the first and second chambers are coupled and a diaphragm is disposed between the two chambers to reduce the amount of fluid leakage between chambers as the tubing passes through the diaphragm. The expansion element may be maintained in the first chamber, or between the two chambers. In a preferred embodiment, the expansion element is disposed within a seal region, such as within a lip seal between a first and second chamber.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain principles of the invention.

DETAILED DESCRIPTION OF THE ILLUSTRATED EMBODIMENTS

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figures 1, 2A, 2B, 2C:
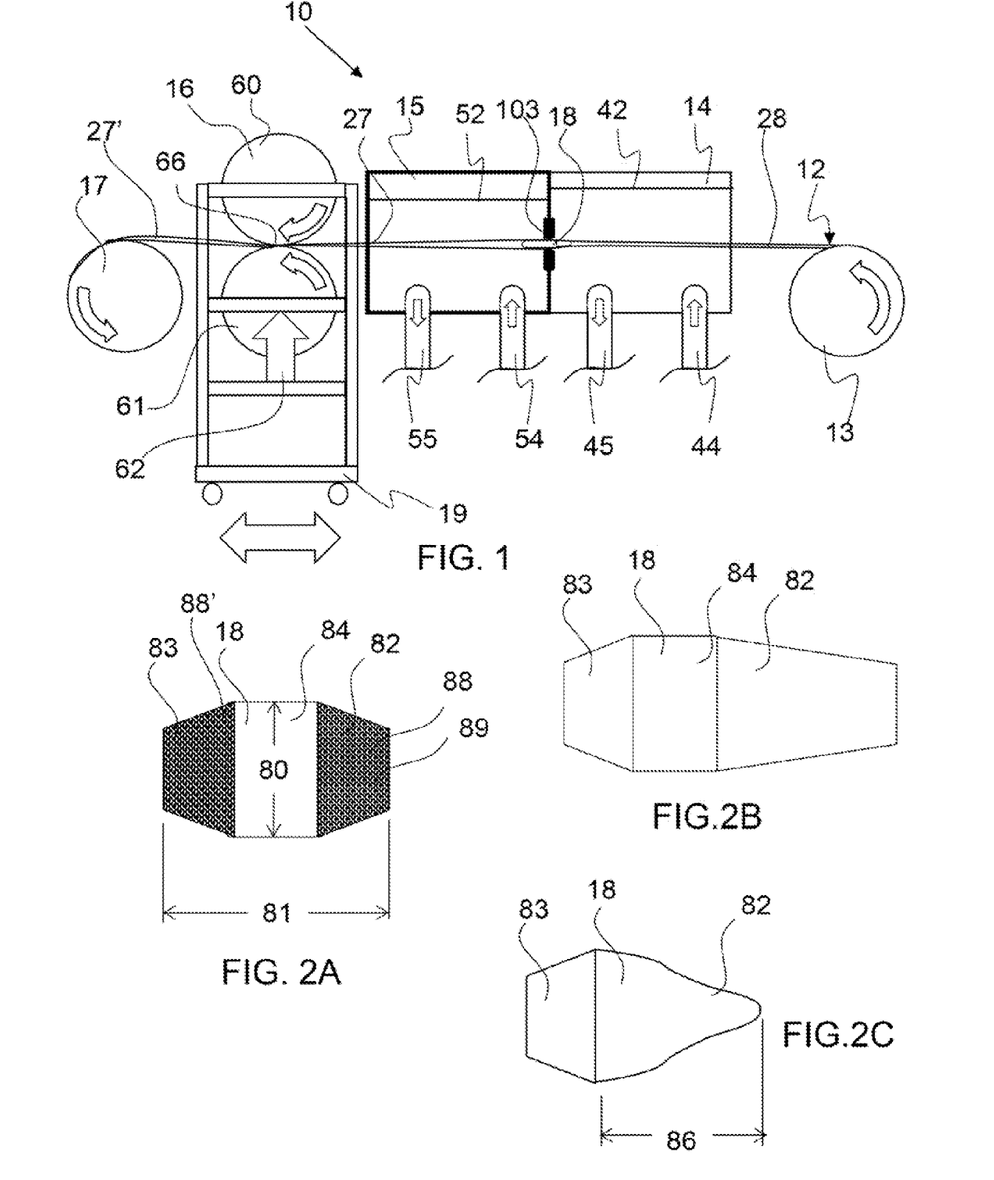
FIG. 1 shows a side view of an exemplary embodiment of a heat-shrink tubing process apparatus as described herein.
FIG. 2A shows a side view of an exemplary expansion element as described herein.
FIG. 2B shows a side view of an exemplary expansion element as described herein.
FIG. 2C shows a side view of an exemplary expansion element as described herein.

As shown if FIG. 1, an exemplary heat-shrink tubing process apparatus 10 comprises a first chamber 14, a second chamber 15, a pinch-roll apparatus 16 coupled to a conveyor 19, and a tube 12 configured therethrough having an expansion element 18 disposed therein. As shown in FIG. 1, the first chamber and second chamber are coupled together by a diaphragm 103. The tubing is configured to pass through the first chamber 14, wherein it is submerged in a first chamber fluid 42. The tubing then passes from the first chamber to a second chamber 15, through a diaphragm 103. The expansion element 18 is located within the diaphragm 103 region, as shown in this exemplary embodiment. The expansion element may be disposed in any suitable location however. In addition, as shown in FIG. 1, a first fluid inlet 44 and first fluid outlet 45 are shown, whereby a heated fluid may be introduced and removed respectively from the first chamber 14. Likewise, as shown in FIG. 1, a second fluid inlet 54 and second fluid outlet 55 are shown coupled to the second chamber 15. The pinch-roll apparatus 16 shown in FIG. 1 comprises a first roller 60, a second roller 61 that are configured to produce a nip 66, or a movable pinch location between the rollers. The first and second rollers of the pinch-roll apparatus may be pressed together by any suitable pressure device 62, such as a pneumatic cylinder, motor and the like. The pinch-roll apparatus is configured to a conveyor 19 that allows the pinch-roll apparatus to move forward and backward, as indicated by the double arrow below the conveyor. The pinch-roll apparatus may be moved forward, or towards the expansion element, to increase the fluid pressure within the tubing between the pinch-roll apparatus and the expansion element within the tubing. A motor, piston or any other suitable drive mechanism may be used to move the pinch-roll apparatus, and/or the conveyor. The heat-shrink tube process apparatus may further comprise a pay-off 13 and a take-up 17, as shown in FIG. 1.

The expansion element 18 is disposed within the tubing 12 as shown in FIG. 1, thereby trapping fluid, such as air, between the expansion element and the nip 66. This air may be maintained at a suitable pressure to prevent the expansion element from moving with the tubing toward the nip. The tubing thereby slides over the expansion element in this continuous process. In the event that the expansion element does move from a desired location, the pinch-roll apparatus may be moved forward, or toward the expansion element, to increase the pressure of the trapped fluid within the tube and force the expansion element to move back into a desired location.

As shown in FIG. 2A through 2C, the expansion element 18 may have any suitable shape and length 81. As shown in FIG. 2A, the expansion element has a uniform design, with a leading portion 82 having generally the same geometry as a trailing portion 83. The leading portion is the end of the expansion element that is initially inserted into the tube end, and faces the incoming tubing to be expanded. As shown in FIG. 2B, the leading portion 82 is elongated and tapered, providing a more gradual expansion of the tubing. The trailing portion 83 may also be tapered to provide a more gradual transition as the tubing move off the expansion element. The expansion element may have any suitable body portion, or area between the leading and trailing portions. The body portion 84 preferably has a consistent diameter 80 over a portion of the length of the body portion, but may have a non-uniform diameter along the length. In addition, an expansion element may have a minimal or no body portion, as shown in FIG. 2C. It is preferred to have a body portion length to allow for locating the expansion element within a seal. Also shown in FIG. 2C is a leading portion having a non-linear diameter change over the length 86 of the leading portion. A non-linear leading portion may help the tubing expand over the expansion element.

Figure 3:
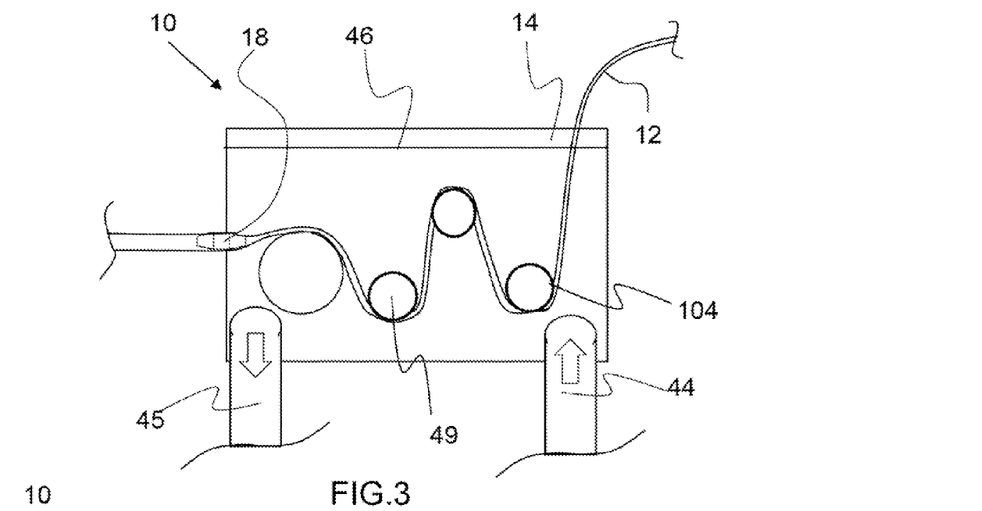
FIG. 3 shows a side view of an exemplary chamber having an accumulator as described herein.

As shown in FIG. 3, a chamber may comprise an accumulator 49 that may allow the tubing to have more resonance time in a chamber. An accumulator may comprise an idler roller 104, or a plurality of idler rollers as shown in FIG. 3.

Figure 4:
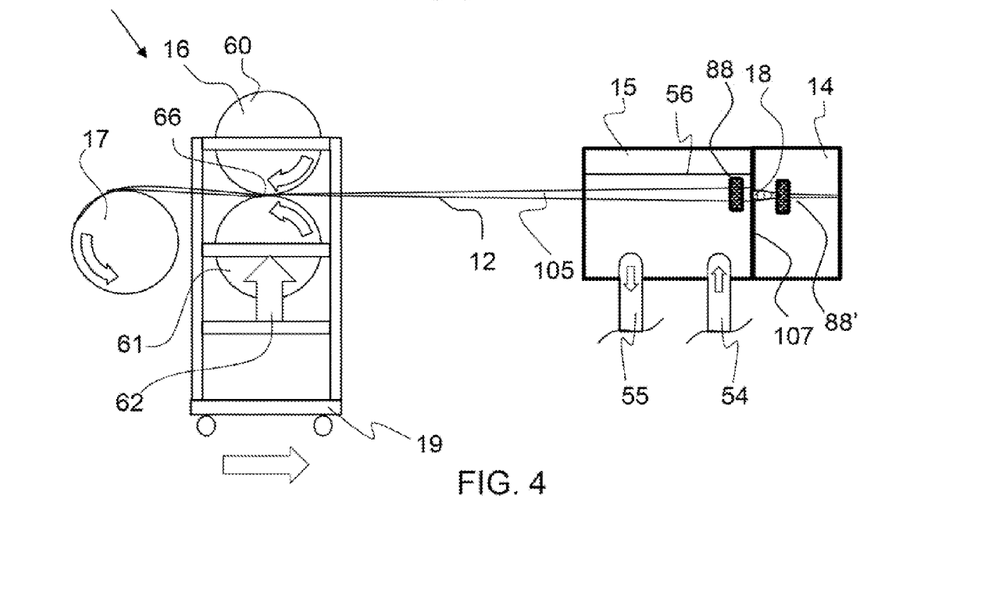
FIG. 4 shows a side view of a portion of an exemplary heat-shrink tubing process apparatus as described herein having a pinch-roll apparatus on a conveyor.

As shown in FIG. 4, the pinch-roll apparatus 16 is being moved forward, as indicated by the arrow under the conveyor, to increase the pressure of the trapped fluid 105, within the tube 12. The expansion element may move with the tubing and out of a desired location, and moving the pinch-roll apparatus toward the expansion element 18 reduces the volume within the tubing between the nip and the expansion element and therefore increases the fluid pressure within the tubing. Increasing the fluid pressure a sufficient amount, by moving the nip position, will force the expansion element to move back into a desired location.

Figure 5:
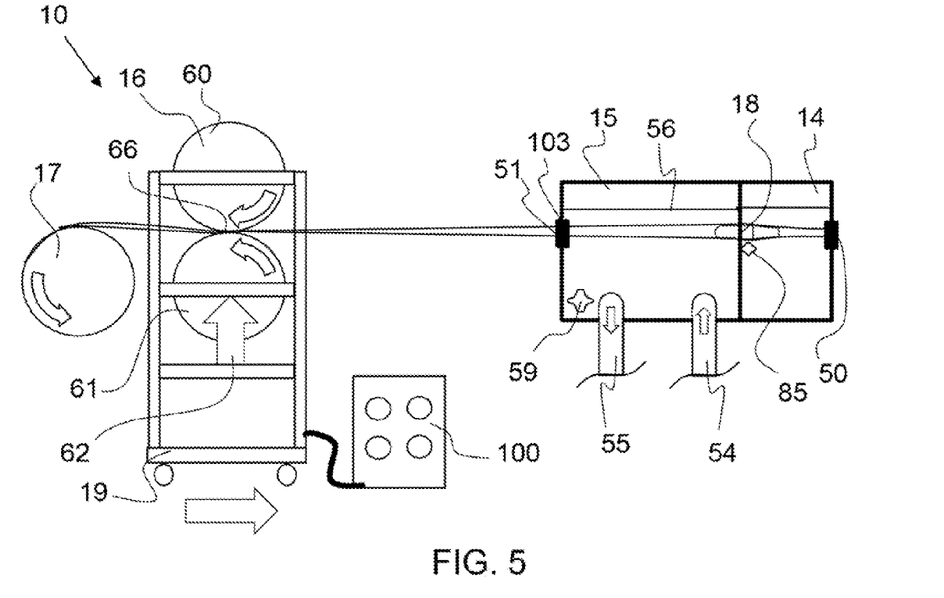
FIG. 5 shows a side view of a portion of an exemplary heat-shrink tubing process apparatus as described herein having a temperature sensor and an expansion element location sensor and a conveyor controller.

As shown in FIG. 5, the heat-shrink tubing process apparatus 10 may comprise an expansion element location sensor 85, such as a proximity sensor or any other suitable locating device. The location sensor 85 may be coupled to a controller that automatically moves the pinch-roll apparatus to return the expansion element to the desired location. In addition, the location sensor 85 may be connected to a visible indicator, such as a light, to alert an operator to move the pinch-roll apparatus. The light may turn off when the expansion element has returned to a desired location. In some embodiments, the tubing may not be transparent, and/or the chambers may not allow an operator to see the location of the expansion element. A location sensor would therefore be useful to maintain the expansion element in a proper location. The walls of the chambers may however be transparent or translucent allowing an operator to see the position of the expansion element within a transparent or translucent tubing being expanded.

In yet another embodiment, a magnet 88, or configuration of magnets, 88 and 88' as shown in FIG. 4, may be used to maintain the position of the expansion element. A magnetic component 89, as used herein, is a material that is magnetic or attracted by a magnetic field, such as metals comprising iron, cobalt, or nickel, for example. The expansion element may comprise a magnetic component 89 and may comprise one or more magnets, or comprise metal that is attracted by magnetic forces such as nickel, cobalt or iron, as shown in FIG. 2A. In one embodiment, the expansion element is a magnetic component and a magnet, or magnets may be configured to create opposing forces to the frictional forces of the tubing moving over the expansion element, and thereby maintain the position of the expansion element. As shown in FIG. 2A, an expansion element may comprise two magnets 88, 88', one on the leading portion and one on the trailing portion respectively. The two magnets shown in FIG. 2A may be configured in any suitable way, including where they attract or repel each other. In an exemplary embodiment, magnets a located downstream of the trailing edge of the expansion element and are configured to repel the expansion element. In the event that the expansion element moves downstream or toward the magnets, the expansion element, configured to be repelled by the magnets, is forced back into position. The magnetic forces would increase as the expansion element moves further downstream toward the magnets and therefore would have a limited range of movement in this embodiment.

A position maintenance feature may comprise one or more magnetic components, and the expansion element may comprise one or more magnet components, or may consist essentially of magnetic material or a magnet. In addition, electromagnets may also be used, thereby allowing for more control of the amount of attractive or repulsive force on the expansion element. One or more magnets may be positioned in a chamber and at least partially around the tubing on the upstream, and/or downstream side of the expansion element. In one embodiment, the expansion element is a magnet and a magnetic metal, another magnet, or any suitable combination of magnets and magnetic metal are positioned to provide a force to maintain the expansion element in a desired location. For example, an expansion element may be a magnet, and a magnet providing a repulsive force may be placed downstream from the expansion element and a magnet having an attractive force may be positioned upstream of the expansion element.

In another embodiment, a tubing extruder is configured to extrude tubing upward, wherein the extruder is configured in a vertical orientation. In this embodiment, an expansion element may be configured to have approximately the effective weight to overcome the frictional forces of the tubing moving over the expansion element. A vertical or upward tubing extrusion may be coupled with any of the other position maintenance features. For example, an upward oriented tubing extruder may be coupled with a configuration of magnets to maintain the position of a magnetic expansion element having the approximate weight to overcome the frictional forces of the tubing. A weighted expansion element and upward oriented extruder may be a position maintenance feature.

Any suitable combination of position maintenance features may be combined. Likewise, components of the position maintenance features may be combined in any suitable way.

Figure 6:
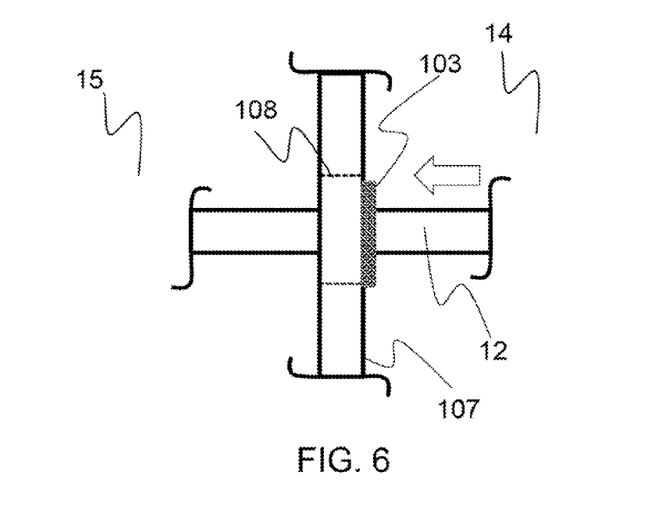
FIG. 6 shows a side view of an exemplary seal as described herein.

As shown in FIG. 6, a lip-seal 103, may be configured over a chamber opening 108 to prevent excessive leakage of fluid from a chamber. A lip-seal 103 comprises a diaphragm material, typically elastomeric, configured within or over a chamber opening 108. A lip seal typically comprises an opening that is smaller than the outer diameter of the tubing, thereby creating a seal when the tubing is inserted through the opening. Any inlet 50, outlet 51 of a chamber, or chamber divider 197 may be configured with a seal, such as a lip-seal 103 as depicted in FIG. 5.

Figure 7A:
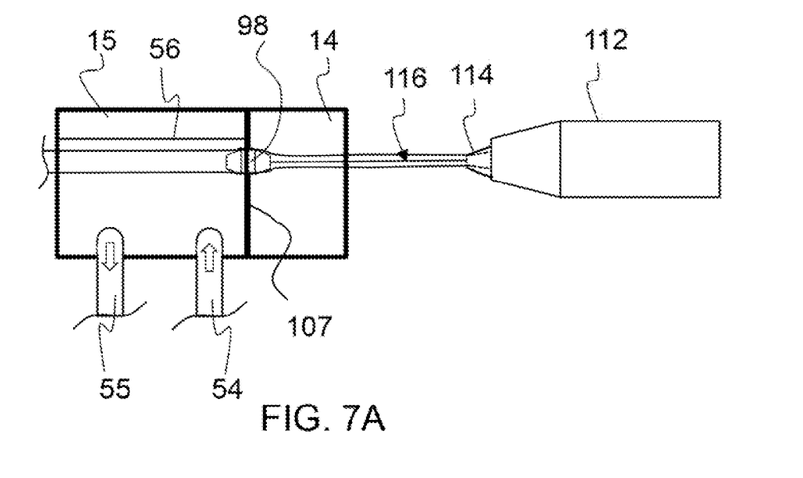
FIG. 7A shows a side view of a tubing extruder having an expansion element attached.
Figure 7B:
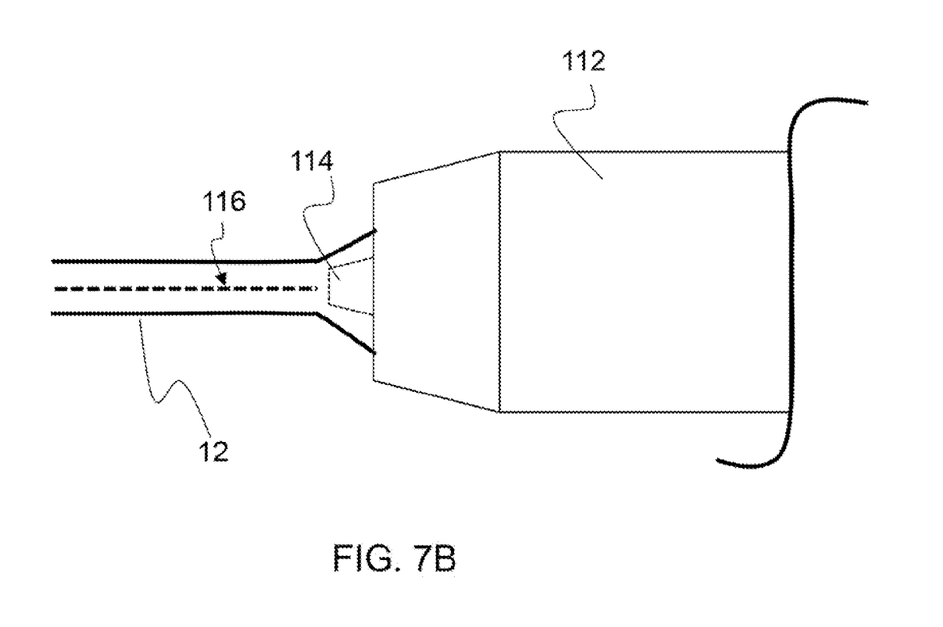
FIG. 7B shows an expanded side view of the extruded tip shown in FIG. 7A.

As shown in FIG. 7A, a heat-shrink tubing process apparatus may be coupled to a tubing extruder. The temperature of the extruded tube may be suitable for expansion over an expansion element as described herein. An extruder connector 116, coupling the tethered expansion element 98 with the extruder 112, may restrain the expansion element from moving along with the tube. This type of tethered expansion element 98 is not free to move downstream with the tubing as it is physically connected by the extruder connector. The expansion elements 18 shown in FIG. 1-6 are free or untethered expansion elements comprising no physical connector or tether to maintain a position of the expansion element. An extruder connector may be a wire that is attached to a center mandrel 114, extruder, or some other fixed point, and may extend through the extruded tubing and attach to the expansion element. A center mandrel may extend from the end of the extruder tip, as shown in FIG. 7B. The extruder connector may be any suitable length. However, it may be advantageous to expand the tubing over the expansion element shortly after extrusion while the tubing is still at an elevated temperature. For this purpose, the expansion element may be more directly coupled to the extruder. An extruder connector is another example of an expansion element position maintenance feature.

Heated, as used herein, in reference to a chamber or fluid within a chamber means that the fluid is heated or maintained at an elevated temperature, such as above room temperature (23° C.).

Cooled, as used herein, in reference to a chamber or fluid within a chamber means that the fluid is cooled or maintained at a reduced temperature, such as below room temperature (23° C.).

The phrase "configured for continuous processing of tubing", as used herein, means that the process is not configured for incremental, or batch processing of discrete lengths of tubing, rather, the process is configured to process the tubing in a dynamic manner, wherein continuous lengths of heat shrinkable tubing may be produced, such as greater than 5 meters. The processed tubing may be cut to discrete lengths after it has been processed to make it heat shrinkable, however this should be understood to be within the scope of the process that is "configured for continuous processing of tubing, as described herein.

It will be apparent to those skilled in the art that various modifications, combination and variations can be made in the present invention without departing from the spirit or scope of the invention. Specific embodiment, features and elements described herein may be modified, and/or combined in any suitable manner. Thus, it is intended that the present invention cover the modifications, combinations and variations of this invention provided they come within the scope of the appended claims and their equivalents.

What is claimed is:

1. A method of making a heat-shrink tube comprising the steps of:
   a. providing a heat-shrink tubing apparatus comprising:
      i. a first chamber comprising a fluid heated to an elevated temperature;
      ii. an untethered expansion element having an outer diameter greater than the inner diameter of a pre-processed tube;
      iii. a pinch-roll apparatus having a nip; and
      iv. a conveyor coupled to said pinch-roll apparatus;
   b. inserting said expansion element into a tube end of said pre-processed tube;
   c. configuring said pre-processed tube into said first chamber and heating said pre-processed tube to an effective temperature to allow it to expand over the expansion element to produce an expanded tube;
   d. configuring said tube end of said expanded tube into said pinch-roll apparatus to trap a fluid within the expanded tube between the nip and the expansion element;
   e. starting said pinch-roll apparatus to pull the expanded tube through the pinch-roll apparatus and move it through the first chamber and over the expansion element; and
   f. moving said pinch-roll apparatus, as required, by said conveyor to adjust a pressure of the fluid within said expanded tube between the nip and the expansion element to maintain position of the expansion element, where at least a portion of the expansion element is maintained in said first chamber.

2. The method of claim 1 further comprising the steps of:
   a. providing a second chamber comprising a fluid maintained at a temperature lower than said elevated temperature of fluid in the first chamber, and coupled with the first chamber wherein there is an opening, having a seal, configured between said first chamber and said second chamber;
   b. configuring the expanded tube into said second chamber after exiting said first chamber, and
   c. configuring the expansion element, having a leading portion a body portion and a trailing portion, with at least a portion of said leading portion in the first chamber, at least a portion of said body portion within said seal and at least a portion of said trailing portion in said second chamber.

3. A heat-shrink tubing apparatus comprising:
   a. a first chamber comprising a fluid heated to an elevated temperature;
   b. an untethered expansion element having an outer diameter greater than the inner diameter of a pre-processed tube;
   c. a pinch-roll apparatus having a nip downstream of the expansion element; and
   d. a conveyor coupled to said pinch-roll apparatus;
      wherein said expansion element is configured within the pre-processed tube and least partially within the first chamber;
      wherein said pinch-roll apparatus pulls, the pre-processed tube over the expansion element to produce an expanded tube; and
      wherein a fluid is trapped within the expanded tube between the nip of the pinch roll apparatus and the expansion element and wherein said trapped fluid has a pressure;
   e. a position maintenance feature that moves the conveyor and pinch-roll apparatus toward and away from the expansion element to change the pressure of the trapped fluid within the expanded tube and maintain a position of the expansion element, where at least a portion of the expansion element is maintained in said first chamber.

4. A heat-shrink tubing apparatus of claim 3, wherein the position maintenance feature comprises a drive mechanism and a controller, wherein the conveyor is coupled to said drive mechanism and whereby said controller comprises a user interface for moving the conveyor by said drive mechanism.

5. A heat-shrink tubing apparatus of claim 4, further comprising an expansion element location sensor that is coupled to said controller, whereby the controller automatically moves the conveyor to maintain a position of the expansion element at least partially within the first chamber.

6. A heat-shrink tubing, apparatus of claim 3, where said first chamber comprises an opening having a seal, wherein the expansion element is positioned at least partially within said seal.

7. A heat-shrink tubing apparatus of claim 3, wherein the fluid of the first chamber a liquid.

8. A heat-shrink tubing apparatus of claim 3, further comprising a second chamber configured proximal to and downstream of the first chamber and comprising a second chamber fluid that is maintained at a temperature less than the fluid of the first chamber.

9. A heat-shrink tubing apparatus claim 8, wherein the second chamber fluid is a liquid.

10. A heat-shrink tubing apparatus of claim 8, wherein the second chambers is configured adjacent the first chamber, wherein a chamber opening is configured between the first and second chambers and wherein the expansion element is positioned at least partially within a seal configured in said chamber opening.

11. A heat-shrink tubing apparatus of claim 3, further comprising an extruder for extruding said pre-processed tubing that, extends over the untethered expansion element.

12. A heat-shrink tubing apparatus of claim 3, wherein the expansion element comprises a tapered leading portion.

13. A heat-shrink tubing apparatus of claim 3, wherein the outer diameter of the expansion element is, at least 2% larger than the inner diameter of the pre-processed tube.

\* \* \* \* \*